(12) United States Patent
Szekely et al.

(10) Patent No.: US 8,657,271 B2
(45) Date of Patent: Feb. 25, 2014

(54) THERMOPLASTIC JOUNCE BUMPERS

(75) Inventors: Peter Laszlo Szekely, Pringy (FR); Damien Van Der Zyppe, Champigny sur Marne (FR)

(73) Assignee: E I du Pont de Nemours and Company, Wilmington, DE (US)

( * ) Notice: Subject to any disclaimer, the term of this patent is extended or adjusted under 35 U.S.C. 154(b) by 60 days.

(21) Appl. No.: 13/197,991

(22) Filed: Aug. 4, 2011

(65) Prior Publication Data

US 2012/0193850 A1 Aug. 2, 2012

Related U.S. Application Data

(60) Provisional application No. 61/372,985, filed on Aug. 12, 2010, provisional application No. 61/479,458, filed on Apr. 27, 2011.

(51) Int. Cl.
*F16F 1/36* (2006.01)
*F16F 7/00* (2006.01)

(52) U.S. Cl.
USPC ............................ 267/292; 267/140; 267/141

(58) Field of Classification Search
USPC .................... 267/292, 293, 64.15, 64.27, 35, 267/219–220, 141, 64.23, 140
See application file for complete search history.

(56) References Cited

U.S. PATENT DOCUMENTS

| 4,235,427 | A | | 11/1980 | Bialobrzeski |
| 4,681,304 | A | | 7/1987 | Hassan |
| 5,192,057 | A | | 3/1993 | Wydra et al. |
| 5,280,889 | A | * | 1/1994 | Amil et al. .................... 267/160 |
| 2008/0272529 | A1 | | 11/2008 | Chervin et al. |
| 2011/0156327 | A1 | * | 6/2011 | Nobusue et al. ............. 267/153 |

FOREIGN PATENT DOCUMENTS

| JP | 59166736 | 9/1984 |
| WO | 2004029155 A3 | 4/2004 |
| WO | WO 2009157567 A1 * | 12/2009 |

OTHER PUBLICATIONS

Dupont Hytrel (R) HTR4275 BK316 Product Information Sheet, Dupont, 2008.*

* cited by examiner

*Primary Examiner* — Anna Momper

(57) ABSTRACT

The invention provides vehicle suspension systems, and more particularly jounce bumpers made of elastomeric thermoplastic material, having improved design to maximize energy absorption.

14 Claims, 4 Drawing Sheets

THERMOPLASTIC JOUNCE BUMPERS

CROSS-REFERENCE TO RELATED APPLICATIONS

This application claims priority from U.S. Patent Application Ser. No. 61/372,985, filed on Aug. 12, 2010, and U.S. Patent Application Ser. No. 61/479,458, filed on Apr. 27, 2011, which are incorporated herein by reference in their entirety.

FIELD OF INVENTION

The present invention relates to the field of vehicle suspension systems, and more particularly to jounce bumpers.

BACKGROUND OF THE INVENTION

A jounce bumper (also called a bump stop, rebound bumper, end-of-travel bumper, strike-out bumper, suspension bumper, or compression bumper) is a shock-absorbing device ordinarily positioned on the top of vehicle suspensions. Jounce bumpers for use in motor vehicle suspension systems have long been used for cushioning the impact between two suspension system components, such as the axle and a portion of the frame, as well as for attenuating noise and vibration to increase the ride comfort of the passengers. Since displacement of the vehicle chassis causes displacements of the strut, the strut undergoes cycles of compression and extension in response to the displacement of the vehicle chassis. Provision must be made for protecting the strut assembly and the vehicle body from the jounce forces associated with severe irregularities in the road surface leading to extreme displacement of the suspension. For this reason, a jounce bumper is attached to the suspension system at a point where impact is likely to occur when the shock absorber fails to absorb the forces created by extraordinary driving conditions. Particularly, during jounce motions of the strut, the damper "bottoms out" and the jounce bumper moves into contact with the jounce bumper plate and compresses to dissipate energy resulting in cushioning the impact, reducing noise, reducing the sensation of impact to the passengers and reducing possible damage to the vehicle suspension system. Jounce bumpers are elongated, generally cylindrical or conical, members with or without convolutes, made of a compressible and elastomeric material that extends around the piston rod. As taught in U.S. Pat. No. 4,681,304, convoluted bumpers function by a progressive stacking of the convolutions to provide resistance to jounce forces.

Materials suitable for this application must be resilient, i.e. capable of withstanding shock without undue permanent deformation or rupture, and must have excellent flex life. Conventional jounce bumpers are formed of foamed polyurethane and vulcanized rubber. For example, jounce bumpers are often formed of microcellular polyurethane (MCU). A microcellular polyurethane jounce bumper is made by casting polyurethane precursors in a jounce bumper mold. Microcellular foam is obtained from the reaction of diisocyanate glycol with a blowing agent or with water which produces carbon dioxide gas for foaming. This technology is time-consuming since foaming requires prolonged times in the mold due to the slow release of carbon dioxide. While jounce bumpers made of foamed polyurethane have good ride characteristics, they are expensive to produce since they require an energy- and time-consuming technology due to the crosslinking.

With the aim of improving durability, inertness to automotive fluids, and resistance to tear propagation of the material used to form the jounce bumper, U.S. Pat. No. 5,192,057 discloses an elongated hollow body formed of an elastomer, preferably from a copolyetherester polymer. As disclosed therein, such pieces, including jounce bumpers having bellows shaped sections with a constant thickness profile, are manufactured by blow molding techniques. An alternative method for forming jounce bumpers, i.e. corrugated extrusion, is described in U.S. Published Patent Application No. 2008/0272529.

In a typical blow molding operation for manufacturing hollow plastic articles a parison of plastic material that has been produced by extrusion or injection molding and which is in a hot moldable condition is positioned between two halves of an open blow mold having a mold cavity of a shape appropriate to the required external shape of the article to be manufactured. The parison gradually moves and stretches under the influence of gravity. When the parison reaches the proper length, the mold halves are closed around it and pressurized air or other compressed gas is introduced in the interior of the parison to inflate it to the shape of mold or to expand it against the sides of the mold cavity. After a cooling period, the mold is opened and the final article is ejected.

In extrusion blow molding, the parison is produced by extruders. Extrusion blow molding is less expensive than foaming/casting but leads to less precise dimensions and leads also to limitations in the wall thickness of the part. The stiffness of a jounce bumper is directly related to its thickness. Thus, a small variation of thickness (either variation from article to article, along the longitudinal axis of a jounce bumper made from one shot, or along the radius of the convolute of a jounce bumper made in a single jounce bumper), for example 0.2 mm, will significantly change the stiffness of the jounce bumper and its energy absorption capacity and dampening performance.

Injection blow molding gives more precise dimensions than extrusion blow molding. In this technique, the parison is formed by injection molding, the inner core of the mold is removed and the parison is quickly inflated while being enclosed in two mold halves as in extrusion blow molding. The parison can be injection molded to have a non-constant cross-section resulting in a better wall thickness uniformity of the final part than from extrusion blow molding. Injection blow molding allows more precise details in the final blown structure but is more expensive than extrusion blow molding.

In general, it is desired to maximize the absorption of energy in a jounce bumper. The energy absorption behavior of a jounce bumper can be measured, for example, by measuring deformation versus applied force. Usually deformation is plotted on the X-axis (in mm), and applied load (force) is plotted on the Y-axis (in N). The area under the curve represents the energy absorbed by the jounce bumper according to the formula $$\text{displacement} \times \text{Force} = \text{energy}.$$

Thermoplastic jounce bumpers made by any of the above-mentioned techniques can exhibit different responses depending on design, including specific configuration details, and materials of manufacture. There remains a need to improve the design of thermoplastic jounce bumpers so as to improve the force-displacement behavior, thereby increasing the energy absorbed.

SUMMARY OF THE INVENTION

In a first aspect, the invention provides a jounce bumper made of elastomeric thermoplastic material, comprising:

a hollow elongated tubular body having a wall, the tubular body having at least two bellows, each bellow being defined by a peak and a trough, the peak having a fillet radius of rs, the trough having a fillet radius of rc and a maximum wall thickness of the trough being at a point within the trough and designated Tmax; wherein rc is greater than rs, and wherein the ratio of Tmax, the maximum thickness of the wall in a trough, to Tm, the thickness of the wall at an intermediate point between peak and trough, is greater than or equal to 1.2, and wherein the trough is defined by a wall arc having end points Tm.

In a second aspect, the invention provides a jounce bumper made of elastomeric thermoplastic material, comprising:
a hollow elongated tubular body having a wall, the tubular body having at least two bellows, each bellow being defined by a peak and a trough, the peak having a fillet radius of rs, the trough having a fillet radius of rc and a wall thickness at the trough of Tc (Tc being Tmax in the case when Tmax falls substantially in the middle of the trough); wherein rc is greater than rs, and wherein the ratio of Tc (Tmax), the thickness of the wall at a trough, to Tm, the thickness of the wall at an intermediate point between peak and trough, is greater than or equal to 1.2.

In a third aspect, the invention provides a method for the manufacture of a jounce bumper, comprising the step of:
shaping elastomeric thermoplastic material into a hollow elongated tubular body having a wall, the tubular body having at least two bellows, each bellow being defined by a peak and a trough, the peak having a fillet radius of rs, the trough having a fillet radius of rc and a maximum wall thickness of the trough being at a point within the trough and designated Tmax; wherein rc is greater than rs, and wherein the ratio of Tmax, the maximum thickness of the wall in a trough, to Tm, the thickness of the wall at an intermediate point between peak and trough, is greater than or equal to 1.2, and wherein the trough is defined by the wall arc having end points of Tm.

In a fourth aspect, the invention provides a method for the manufacture of a jounce bumper, comprising the step of:
shaping elastomeric thermoplastic material into a hollow elongated tubular body having a wall, the tubular body having at least two bellows, each bellow being defined by a peak and a trough, the peak having a fillet radius of rs, the trough having a fillet radius of rc and a wall thickness at the trough of Tc (Tc being Tmax in the case when Tmax falls substantially in the middle of the trough); wherein rc is greater than rs, and wherein the ratio of Tc (Tmax), the thickness of the wall at a trough, to Tm, the thickness of the wall at an intermediate point between peak and trough, is greater than or equal to 1.2.

In a fifth aspect, the invention provides a method for absorbing shocks in an automobile suspension comprising using a jounce bumper to absorb energy from displacement of the suspension, wherein the jounce bumper is made of elastomeric thermoplastic material and comprises a hollow elongated tubular body having a wall, the tubular body having at least two bellows, each bellow being defined by a peak and a trough, the peak having a fillet radius of rs, the trough having a fillet radius of rc and a maximum wall thickness of the trough being at a point within the trough and designated Tmax; wherein rc is greater than rs, and wherein the ratio of Tmax, the maximum thickness of the wall in a trough, to Tm, the thickness of the wall at an intermediate point between peak and trough, is greater than or equal to 1.2, and wherein the trough is defined by the wall arc having end points Tm.

In a sixth aspect, the invention provides a method for absorbing shocks in an automobile suspension comprising using a jounce bumper to absorb energy from displacement of the suspension, wherein the jounce bumper is made of elastomeric thermoplastic material and comprises a hollow elongated tubular body having a wall, the tubular body having at least two bellows, each bellow being defined by a peak and a trough, the peak having a fillet radius of rs, the trough having a fillet radius of rc and a wall thickness at the trough of Tc (Tc being Tmax in the case when Tmax falls substantially in the middle of the trough); wherein rc is greater than rs, and wherein the ratio of Tc (Tmax), the thickness of the wall at a trough, to Tm, the thickness of the wall at an intermediate point between peak and trough, is greater than or equal to 1.2.

DETAILED DESCRIPTION OF THE INVENTION

All documents referred to herein are incorporated by reference.

The inventors have found that in a jounce bumper made from elastomeric thermoplastic material, when the ratio of (Tmax/Tm) of the maximum wall thickness in a trough (Tmax) to the thickness of the wall at an intermediate point between peak and trough Tm is greater than or equal to 1.2, superior absorption of energy is obtained, as measured, for example, by deformation versus applied force. In a preferred embodiment, the maximum wall thickness in the trough occurs substantially in the middle of the trough, in which case Tmax is designated Tc.

The inventors have found that in a jounce bumper made from elastomeric thermoplastic material, when the ratio (Tc/Tm) of thickness of the wall at a trough (Tc) to the thickness of the wall at an intermediate point between peak and trough (Tm) is greater than or equal to 1.2, superior absorption of energy is obtained, as measured, for example, by deformation versus applied force. As used herein the term superior energy absorption means both a high force along the displacement, i.e. at least 550N for 50% relative deformation and at the same time a high level of deformation when the force is very high, i.e. at least 65% relative deformation at 10 KN. The level of energy absorption can be estimated by the force level at 50 and/or 60% relative deformation and the relative deformation at 10 KN.

Tc (Tmax) and Tm are often measured for all convolutes in a jounce bumper and the average values are taken as Tc (Tmax) and Tm, due to small variations from convolute to convolute.

Figure 2A:
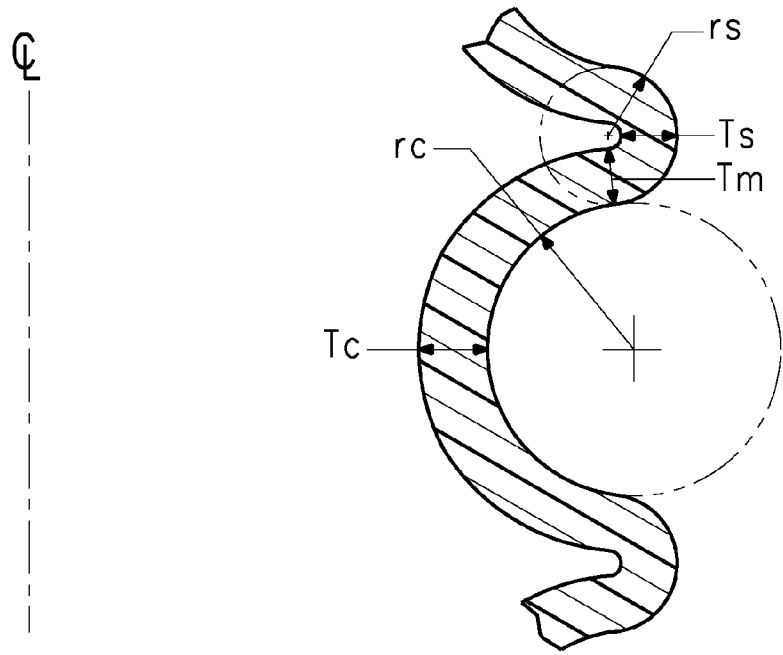
FIG. 2A is a schematic cross-section enlarged view of FIG. 1, wherein the dashed line represents the longitudinal axis of the jounce bumper, rs designates the fillet radius of an outward convolute, and rc designates the fillet radius on an inward convolute, Ts designates the wall thickness at the peak of an outward convolute, Tc (also Tmax) designates the wall thickness at the trough (inward convolute) in the case where the maximum wall thickness Tmax occurs at the middle of the trough, and Tm designates the intermediate wall thickness at the point of tangency between a circle having radius rc and a circle having radius rs. The trough is defined by the wall arc having end points of Tm.
Figure 2B:
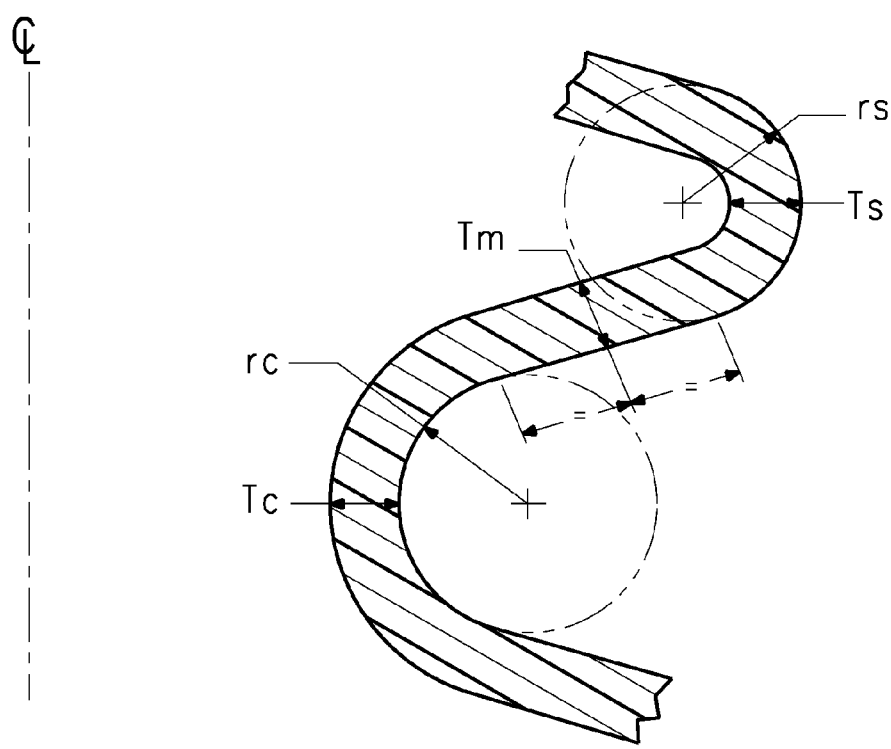
FIG. 2B is a schematic cross-section enlarged view of a jounce bumper showing the case when circles of radius rs and rc are not tangent. The dashed line represents the longitudinal axis of the jounce bumper, rs designates the fillet radius of an outward convolute, and rc designates the fillet radius on an inward convolute, Ts designates the wall thickness at the peak of an outward convolute, Tc (Tmax) designates the wall thickness at the trough (inward convolute) in the case where the maximum wall thickness Tmax occurs at the middle of the trough, and Tm designates the intermediate wall thickness at the mid-point of a line drawn tangent to both a circle having radius rc and a circle having radius rs.

The invention relates to "inward" jounce bumpers, which are those in which the peak fillet radius, rs, is smaller than the trough fillet radius, rc (i.e. rc>rs), as exemplified in FIGS. 2A and 2B.

Figure 1:
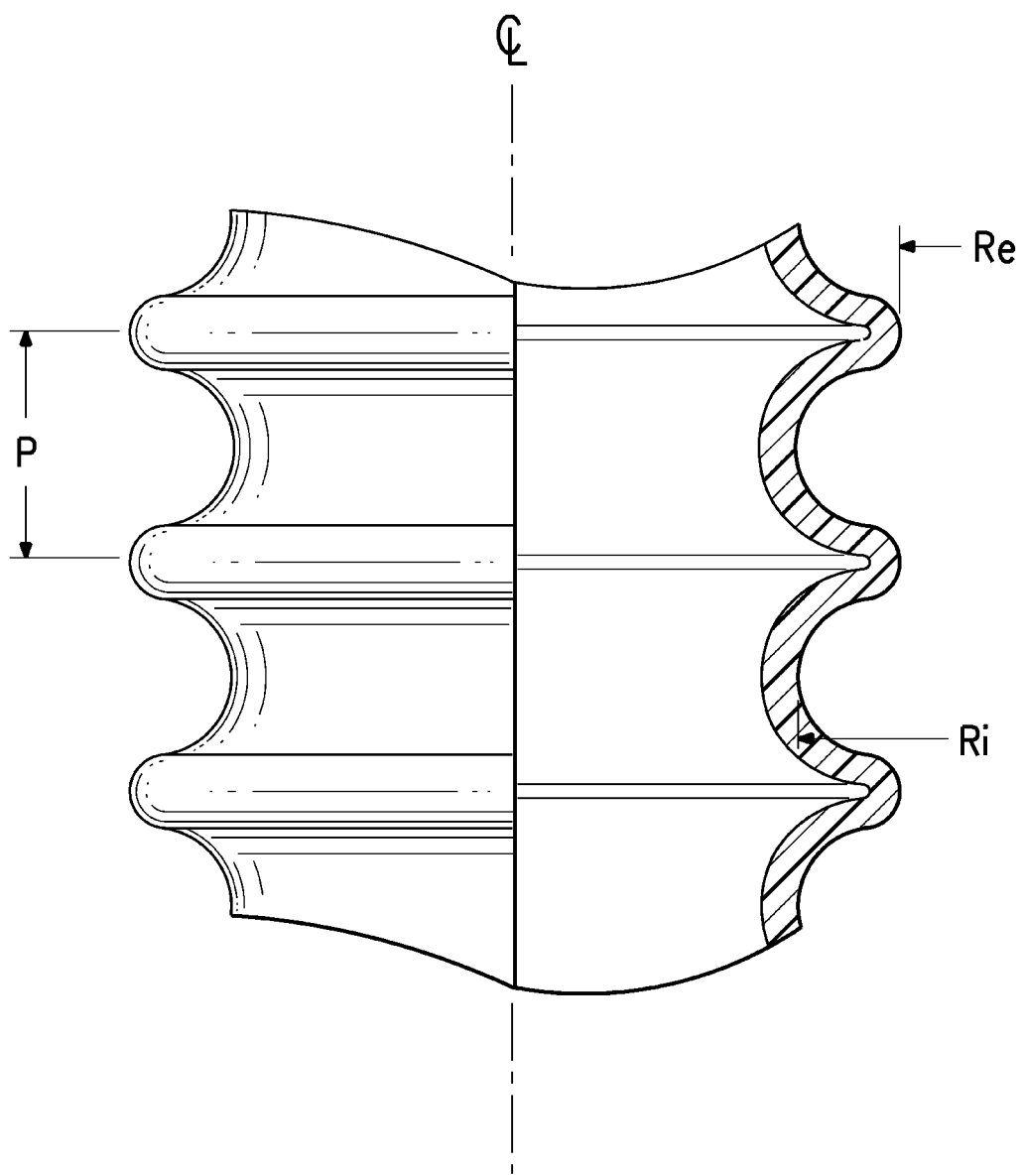
FIG. 1 is a schematic broken view of an "inward" jounce bumper, wherein Re designates the external radius at a peak, Ri designates the external radius at a trough, and P represents the distance from peak to peak (the pitch).

The principle of the invention can be better understood by examining FIGS. 1, 2A and 2B. FIG. 1 shows a typical "inward" jounce bumper. It is a hollow tube-shaped article, having outward and inward convolutes. The geometry will be defined by a pitch (P) which is the distance from one peak to the next, the external radius at a peak (Re), and the external radius at a trough (Ri). Both Re and Ri are measured from the longitudinal axis of the jounce bumper (i.e. the imaginary line that passes longitudinally through the centre of the jounce bumper). The outermost point on an outward convolute is referred to as a peak, and the point of most inward pinching (without taking into account the thickness of the convolutes) is referred to as a trough.

FIG. 2A shows an enlargement of a bellows consisting of an outward convolute and an inward convolute. The outward convolute (top) is defined by a radius rs, and the inward convolute (bottom) is defined by a radius rc. An "inward" jounce bumper is any jounce bumper in which rc is greater than rs. If circles are drawn having radii rs and rc, the point of tangency of these two circles is a point on the wall of the jounce bumper intermediate between a peak and a trough. The wall of the jounce bumper at this point has thickness Tm. As shown in FIG. 2B, in cases in which there is no point of tangency between circles rs and rc, Tm is defined as the middle of the segment of the tangent to rs and rc circles. A trough is defined by the wall arc having end points of Tm. The maximum wall thickness in the trough is designated Tmax. In cases where Tmax occurs substantially in the middle of the trough, Tmax is designated Tc. The inventors have found that when the ratio (Tmax/Tm) of maximum thickness of the wall in a trough (Tmax) to the thickness of the wall at an intermediate point between peak and trough (Tm) is greater than or equal to 1.2, a jounce bumper showing superior absorption of energy is obtained.

In preferred embodiments, Tmax/Tm is greater than 1.3, more preferably greater than 1.5, for example 1.62 or 2.03. The upper value of Tmax/Tm is not particularly limited, although in practice it is rare for Tmax/Tm to be greater than 10.

In all cases in which Tmax occurs substantially in the middle of a trough, Tmax can be designated Tc.

Jounce bumpers according to the invention maximize the energy absorbed, as measured by displacement (or deformation) versus applied force. In a preferred embodiment, the jounce bumpers also maximize the displacement achieved for a given applied force, and maximize the displacement at maximum force (i.e. when the jounce bumper is fully compressed). The displacement at maximum force (full compression) is often measured at a force of ten kiloNewtons (10 kN) and is referred to as X10 KN, for a relative deformation X at an applied force of ten kiloNewtons. To maximize energy absorption and maximize X10 KN, the inventors have found that it is desirable not only that Tmax/Tm be greater than or equal to 1.2, but also that the ratio of the maximum wall thickness in a trough, Tmax, to the wall thickness at the intermediate point, Tm, be greater than a certain value, which certain value is dependant on the pitch, P, maximum wall thickness at a trough, Tmax, and the external radius at a trough, Ri. This can be expressed by the following combination of features:

$$Tmax/Tm \geq 1.2;\ \text{and}$$

$$(Tmax/Tm) > (Tmax/Tm)_1 \text{ wherein } (Tmax/Tm)_1 = 3.43 - 0.05P - 0.222\text{SQRT}(95 - 4.19P + 0.05P^2 - 0.23Ri).$$

Where:
Tmax is the maximum wall thickness at a trough;
Tm is the wall thickness at the point of tangency between a circle of radius rc and a circle of radius rs, or in cases in which rs and rc are not tangent, Tm is the wall thickness at the midpoint of a line drawn tangent to circles rs and rc;
SQRT is square root;
P is the pitch; and
Ri is the external radius at a trough.
Alternatively, in cases in which Tmax occurs substantially in the middle of a trough, this can be expressed:

$$Tc/Tm \geq 1.2;\ \text{and}$$

$$(Tc/Tm) > (Tc/Tm)_1 \text{ wherein } (Tc/Tm)_1 = 3.43 - 0.05P - 0.222\text{SQRT}(95 - 4.19P + 0.05P^2 - 0.23Ri).$$

Where:
Tc is the maximum wall thickness at a trough;
Tm is the wall thickness at the point of tangency between a circle of radius rc and a circle of radius rs, or in cases in which rs and rc are not tangent, Tm is the wall thickness at the midpoint of a line drawn tangent to circles rs and rc;
SQRT is square root;
P is the pitch; and
Ri is the external radius at a trough.

The pitch, P, may be constant, meaning that the distance from peak to peak (or trough to trough) is always the same, or it may be non-constant. Preferably it is constant.

For use with automobiles, a typical pitch, P, is between at or about 10 and 30 mm, more preferably between at or about 13 and 23 mm, the thicknesses Tc and Tm are typically chosen between at or about 2 and 5 mm, more preferably between at or about 2 and 4 mm, and Ri is typically at or about 10 to 40 mm, more preferably at or about 15 to 25 mm.

The number of convolutes and the overall height of the jounce bumper can be chosen depending on the size and weight of the vehicle.

The jounce bumper of the invention may be made from or comprise any thermoplastic elastomer. Preferably, a thermoplastic elastomer is used that has a relatively high melt viscosity (i.e. a melt flow rate between about 0.5 and 8 g/10 min, more preferably between 1 and 8 g/10 min, more preferably between 2 and 6 g/10 min, more preferably between 3 and 5 g/10 min, particularly preferably 4 g/10 min at 230° C. under 5 kg load according to ISO1133). Preferably the elastomer has a hardness between at or about 45 and 60D, more preferably at or about 47 to 55D (at 1s according to ISO868). Particularly preferably the elastomer is a segmented copolyetherester having soft segments of polytetramethylene ether glycol (PTMEG).

Examples of thermoplastic elastomers useful for the jounce bumper of the present invention include those defined in ISO 18064:2003(E), such as thermoplastic polyolefinic elastomers (TPO), styrenic thermoplastic elastomers (TPS), thermoplastic polyether or polyester polyurethanes (TPU), thermoplastic vulcanizates (TPV), thermoplastic polyamide block copolymers (TPA), copolyester thermoplastic elastomers (TPC) such as copolyetheresters or copolyesteresters, and mixtures thereof; also suitable materials are thermoplastic polyesters and mixtures thereof.

Thermoplastic polyolefinic elastomers (TPO's) consist of thermoplastic olefinic polymers, for example polypropylene or polyethylene, blended with a thermoset elastomer. A typical TPO is a melt blend or reactor blend of a polyolefin plastic, generally a polypropylene polymer, with an olefin copolymer elastomer, typically an ethylene-propylene rubber (EPR) or an ethylene-propylene-diene rubber (EPDM). Common olefin copolymer elastomers include EPR, EPDM, and ethylene copolymers such as ethylene-butene, ethylene-hexene, and ethylene-octene copolymer elastomers (for example Engage® polyolefin elastomer, which is commercially available from The Dow Chemical Co.) and ethylene-butadiene rubber.

Styrenic thermoplastic elastomers (TPS's) consist of block copolymers of polystyrene and rubbery polymeric materials, for example polybutadiene, a mixture of hydrogenated polybutadiene and polybutadiene, poly(ethylene-propylene) and hydrogenated polyisoprene. Specific block copolymers of the styrene/conjugated diene/styrene type are SBS, SIS, SIBS, SEBS and SEPS block copolymers. These block copolymers are known in the art and are commercially available.

Thermoplastic polyurethanes (TPU's) consist of linear segmented block copolymers composed of hard segments comprising a diisocyanate, a short chain glycol and soft segments comprising diisocyanate and a long chain polyol as represented by the general formula

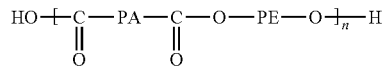

wherein
"X" represents a hard segment comprising a diisocyanate and a short-chain glycol, "Z" represents a soft segment comprising a diisocyanate and a long-chain polyol and "Y" represents the residual group of the diisocyanate compound of the urethane bond linking the X and Z segments. The long-chain polyol includes those of a polyether type such as poly(alkylene oxide)glycol or those of polyester type.

Thermoplastic vulcanizates (TPV's) consist of a continuous thermoplastic phase with a phase of vulcanized elastomer dispersed therein. Vulcanizate and the phrase "vulcanizate rubber" as used herein are intended to be generic to the cured or partially cured, crosslinked or crosslinkable rubber as well as curable precursors of crosslinked rubber and as such include elastomers, gum rubbers and so-called soft vulcanizates. TPV's combine many desirable characteristics of crosslinked rubbers with some characteristics, such as processability, of thermoplastic elastomers. There are several commercially available TPVs, for example Santoprene® and Sarlink® (TPV's based on ethylene-propylene-diene copolymers and polypropylene) which are respectively commercially available from Advanced Elastomer Systems and DSM; Nextrile™ (TPV based on nitrile rubber and polypropylene) which is commercially available from Thermoplastic Rubber Systems; Zeotherm® (TPV based on acrylate elastomer and polyamide) which is commercially available from Zeon Chemicals; and DuPont™ ETPV from E. I. du Pont de Nemours and Company, which is described in International Patent Application Publication WO 2004/029155 (thermoplastic blends comprising from 15 to 60 wt. % of polyalkylene phthalate polyester polymer or copolymer and from 40 to 85 wt. % of a crosslinkable poly(meth)acrylate or polyethylene/(meth)acrylate rubber dispersed phase, wherein the rubber has been dynamically crosslinked with a peroxide free radical initiator and an organic diene co-agent).

Thermoplastic polyamide block copolymers (TPA's) consist of linear and regular chains of polyamide segments and flexible polyether or polyester segments or soft segments with both ether and ester linkages as represented by the general formula

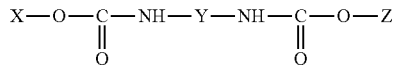

wherein
"PA" represents a linear saturated aliphatic polyamide sequence and "PE" represents for example a polyoxyalkylene sequence formed from linear or branched aliphatic polyoxyalkylene glycols or a long-chain polyol with either ether linkages, ester linkages or linkages of both types and mixtures thereof or copolyethers and copolyesters derived therefrom. The softness of the copolyetheramide or the copolyesteramide block copolymers generally decreases as the relative amount of polyamide units is increased.

Suitable examples of thermoplastic polyamide block copolymers for use in the present invention are commercially available from Arkema or Elf Atochem under the trademark Pebax®.

For an excellent balance of grease resistance, high temperature durability and low temperature flexibility, the jounce bumper according to the present invention may be made from thermoplastic polyester compositions. Preferred thermoplastic polyesters are typically derived from one or more dicarboxylic acids (where herein the term "dicarboxylic acid" also refers to dicarboxylic acid derivatives such as esters) and one or more diols. In preferred polyesters the dicarboxylic acids comprise one or more of terephthalic acid, isophthalic acid, and 2,6-naphthalene dicarboxylic acid, and the diol component comprises one or more of $HO(CH_2)_nOH$ (I); 1,4-cyclohexanedimethanol; $HO(CH_2CH_2O)_mCH_2CH_2OH$ (II); and $HO(CH_2CH_2CH_2CH_2O)_zCH_2CH_2CH_2CH_2OH$ (III), wherein n is an integer of 2 to 10, m on average is 1 to 4, and z is on average about 7 to about 40. Note that (II) and (III) may be a mixture of compounds in which m and z, respectively, may vary and that since m and z are averages, they need not be integers. Other dicarboxylic acids that may be used to form the thermoplastic polyester include sebacic and adipic acids. Hydroxycarboxylic acids such as hydroxybenzoic acid may be used as comonomers. Specific preferred polyesters include poly(ethylene terephthalate) (PET), poly(trimethylene terephthalate) (PTT), poly(1,4-butylene terephthalate) (PBT), poly(ethylene 2,6-naphthoate), and poly(1,4-cyclohexyldimethylene terephthalate) (PCT).

Copolyester thermoplastic elastomers (TPC) such as copolyetheresters or copolyesteresters are copolymers that have a multiplicity of recurring long-chain ester units and short-chain ester units joined head-to-tail through ester linkages, said long-chain ester units being represented by formula (A):

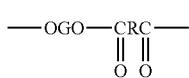

and said short-chain ester units being represented by formula (B):

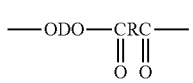

wherein
G is a divalent radical remaining after the removal of terminal hydroxyl groups from poly(alkylene oxide)glycols having preferably a number average molecular weight of between about 400 and about 6000; R is a divalent radical remaining after removal of carboxyl groups from a dicarboxylic acid having a molecular weight of less than about 300; and D is a divalent radical remaining after removal of hydroxyl groups from a diol having a molecular weight preferably less than about 250; and wherein said copolyetherester(s) preferably contain from about 15 to about 99 wt. % short-chain ester units and about 1 to about 85 wt. % long-chain ester units.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

The term "short-chain ester units" as applied to units in a polymer chain of the copolyetheresters refers to low molecular weight compounds or polymer chain units. They are made by reacting a low molecular weight diol or a mixture of diols with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred diols are aliphatic diols containing 2-8 carbon atoms, and a more preferred diol is 1,4-butanediol.

Copolyetheresters that have been advantageously used for the manufacture of the jounce bumper of the present invention are commercially available from E. I. du Pont de Nemours and Company, Wilmington, Del. under the trademark Hytrel® copolyetherester elastomer.

According to a preferred embodiment, jounce bumpers according to the present invention are made of copolyester thermoplastic elastomers (TPC) such as copolyetheresters or copolyesteresters, and mixtures thereof. More preferably a copolyetherester is used that is made from an ester of terephthalic acid, e.g. dimethylterephthalate, 1-4 butanediol and a poly(tetramethylene ether) glycol. The weight percent of short-chain ester units is about 50 where the remainder is long-chain ester units. The copolyetherester elastomer has a high melt viscosity with a melt flow rate of about 4 g/10 nm at 230° C. under 5 kg load as measured according to ISO1133. Its hardness is about 47 shore D at 1s as measured according to ISO868.

The material used to manufacture the jounce bumpers according to the present invention may comprise additives including plasticizers; stabilizers; antioxidants; ultraviolet absorbers; hydrolytic stabilizers; anti-static agents; dyes or pigments; fillers, fire retardants; lubricants; reinforcing agents such as fibers, flakes or particles of glass; minerals, ceramics, carbon among others, including nano-scale particles; processing aids, for example release agents; and/or mixtures thereof. Suitable levels of these additives and methods of incorporating these additives into polymer compositions are known to those of skill in the art.

The jounce bumper of the invention may be made by any shaping operation or method suitable for shaping thermoplastic elastomer material. Examples of such shaping operations or methods comprise operations that include: injection molding, extrusion (e.g. corrugated extrusion), and blow molding (including extrusion blow molding and injection blow molding). Blow molding is particularly preferred as it allows good control over the final geometry of the part and a good balance between the control of the final geometry and the cost of the process.

Some dimensions of two examples of jounce bumpers according to the invention are listed in Table 1 below. Table 1 concerns two jounce bumpers in which Tmax occurs substantially at the middle of the trough, and so Tmax is designated Tc:

TABLE 1

Dimensions of Two Examples of Jounce Bumpers According to the Invention

| | Unit | Example A | Example B |
|---|---|---|---|
| Tc (=Tmax, average for all troughs) | mm | 2.83 | 3.05 |
| Tm (average for all convolutes) | mm | 1.75 | 1.5 |
| Ratio Tc/Tm | — | 1.62 | 2.03 |
| Pitch (P) | mm | 15 | 15 |
| Ri (external radius at trough) | mm | 21.6 | 21.6 |

Figure 4:
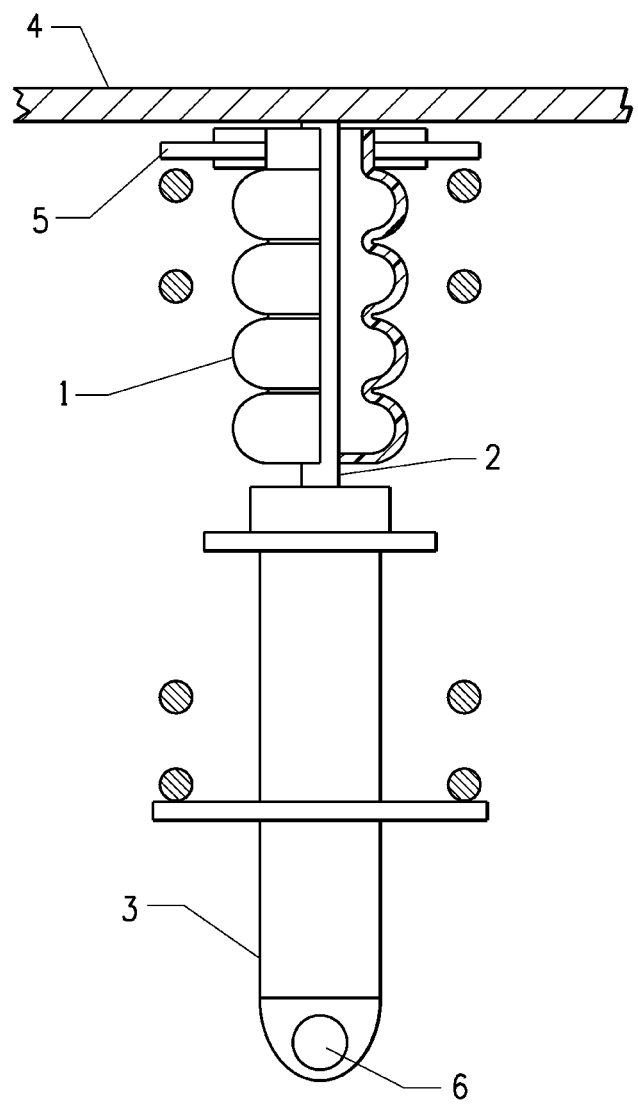
FIG. 4 shows a partially cut-away view of one example of a jounce bumper as installed in the suspension of an automobile.

In use, the jounce bumper is installed on a suspension rod of a vehicle between the vehicle chassis and a shock absorber. An example of an installation is shown schematically in FIG. 4. Referring to FIG. 4, the jounce bumper (1) is installed over the shock absorber rod (2), such that displacement of the shock absorber (3) in the upward direction results in axial compression of the jounce bumper between the shock absorber (3) and the chassis (4). If desired, the jounce bumper (1) can be held in position by a suspension support (5). The numeral (6) identifies the end of the shock absorber connected to the wheel axle.

EXAMPLES

Jounce bumpers according to the invention, E1 and E2, were prepared by blow molding copolyetherester elastomer made from an ester of terephthalic acid, e.g. dimethylterephthalate, 1-4 butanediol and a poly(tetramethylene ether) glycol. Jounce bumpers E1 and E2 both have Tmax substantially in the middle of the troughs, as so Tmax is designated Tc). The weight percentage of short-chain ester units was about 50 and the remainder of the ester units were long-chain ester units. The copolyetherester elastomer had a melt flow rate of about 4 g/10 minutes at 230° C. under 5 kg load according to ISO1133. Its hardness was about 47 shore D at 1s according to ISO868. A comparative jounce bumper C1 was also prepared from this material.

The dimensions of the jounce bumpers are listed in Table 2. The jounce bumpers according to the invention, E1 and E2, had Tc/Tm>1.2 (alternatively expressed as Tmax/Tm>1.2), whereas the jounce bumper of comparative example C1, had Tc/Tm=1.15 (i.e. less than 1.2).

Additionally, jounce bumpers E1 and E2 meet the requirements:

$Tc/Tm \geq 1.2$; and $(Tc/Tm) > (Tc/Tm)_1$ wherein $(Tc/Tm)_1 = 3.43 - 0.05P - 0.222 SQRT(95 - 4.19P + 0.05P^2 - 0.23Ri)$.

Where:
Tc is the maximum wall thickness at a trough (and is alternatively designated Tmax);
Tm is the wall thickness at the point of tangency between a circle of radius rc and a circle of radius rs, or in cases in which rs and rc are not tangent, Tm is the wall thickness at the midpoint of a line drawn tangent to circles rs and rc;
SQRT is square root;
P is the pitch; and
Ri is the external radius at a trough.

TABLE 2

Dimensions and Compression Behavior of Jounce Bumpers

| | Unit | C1 | E1 | E2 |
|---|---|---|---|---|
| Original height | mm | 29.1 | 29.4 | 29.8 |
| Tc(average for all troughs) | mm | 2.42 | 2.83 | 3.05 |
| Tm (average for all convolutes) | mm | 2.1 | 1.75 | 1.5 |
| Average thickness Ts | mm | 2.4 | 1.80 | 1.5 |
| Ratio Tc/Tm | — | 1.15 | 1.62 | 2.03 |
| Pitch (P) | mm | 15 | 15 | 15 |
| Ri (external radius at trough) | mm | 21.6 | 21.6 | 21.6 |
| Force at 50% rel. def. F50 | N | 529 | 603 | 775 |
| Force at 60% rel. def. F60 | N | 793 | 1117 | 1362 |
| Rel. Def. at 10KN, X10KN | % | 77.5 | 76.9 | 75.1 |

Results of calculations [i.e. calculated values of $(Tc/Tm)_1$ as compared to Tc/Tm] are shown in Table 3.

For jounce bumpers E1 and E2, $Tc/Tm > (Tc/Tm)_1$, whereas for comparative jounce bumper C1, $Tc/Tm < (Tc/Tm)_1$.

TABLE 3

Tc/Tm of Jounce Bumpers

| Jounce bumper | Tc/Tm | $(Tc/Tm)_1$ (calculated) |
|---|---|---|
| C1 (comparative) | 1.15 | 1.32 |
| E1 | 1.62 | 1.32 |
| E2 | 2.03 | 1.32 |

Compression response was measured using two isolated bellows. The molded parts were cut in this fashion to avoid artifacts from the ends of the jounce bumper. The zero mm reference point was an external point located on the plate of the compression machine.

The molded parts were conditioned by applying 3 compression cycles from 0 to 10 KN at 50 mm/min at 23° C. The parts were then released and maintained for one hour at a temperature of 23° C. without stress. The molded parts were then exposed to a fourth compression cycle using the same conditions as the first three cycles. This last cycle defined the static compression curve of the jounce bumpers.

Table 2 lists force required to give 50% relative deformation (F50), force required to give 60% relative deformation (F60) and relative deformation at the application of 10 KN force (X10 KN). It is clear that the force required to cause 50% relative deformation of the jounce bumpers according to the invention, i.e. E1 and E2, which have Tc/Tm of 1.62 and 2.03, respectively, is substantially higher (603 N and 775 N, respectively) than the force required to cause 50% relative deformation in the comparative jounce bumper C1, which has Tc/Tm of 1.15 (529 N). This is also true at 60% relative deformation. Jounce bumpers E1 and E2 require forces of 1117 N and 1362 N to cause a deformation of 60%, whereas comparative jounce bumper C1 requires only a force of 793 N to cause the equivalent deformation. The relative deflection at 10 KN, X10 KN, is still very high, in fact above 75%, and similar to that exhibited by the comparative jounce bumper C1. This indicates that jounce bumpers according to the invention, E1 and E2, are significantly more effective with respect to absorbing energy than the comparative jounce bumper C1.

Figure 3:
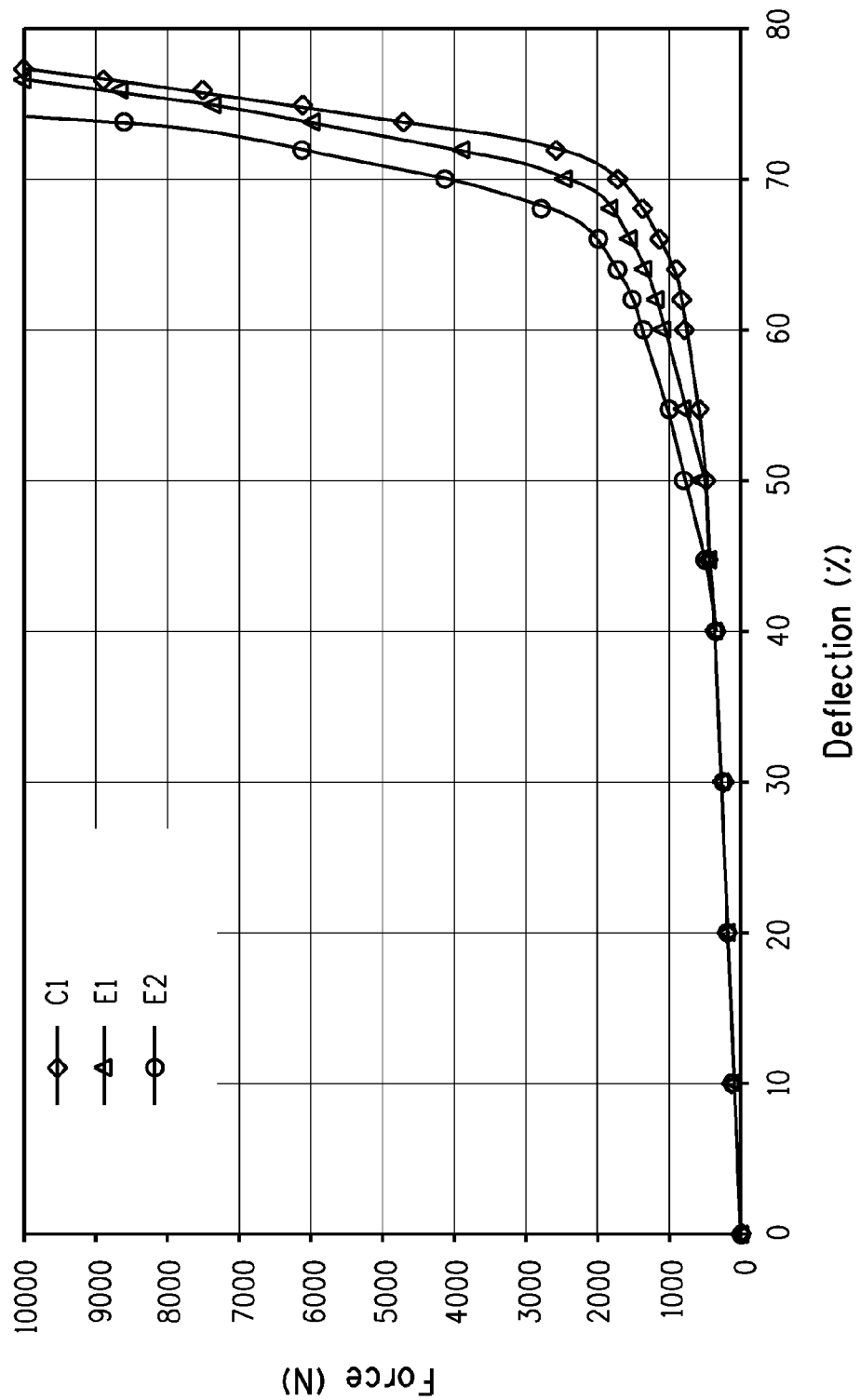
FIG. 3 illustrates percent deformation (deflection) (%) on the X-axis vs. applied force (N) on the Y-axis for jounce bumpers according to the invention, i.e. E1 and E2, and a comparative jounce bumper, i.e. C1. The percent deformation is defined as the ratio of actual deformation in mm to the initial height in mm of the jounce bumper (after 2-4 preconditioning compressions). The curve for E1 is designated with triangles, the curve for E2 is designated with circles and the curve for C1 is designated with diamonds.

Results for the comparative jounce bumper C1 and inventive jounce bumpers E1 and E2 are shown graphically in FIG. 3, in which percent deflection (%) is plotted on the X-axis and applied force (N) is plotted on the Y-axis. The percent deformation is defined as the ratio of actual deformation in mm to the initial height in mm of the jounce bumper prior to its first compression. The results for jounce bumper E1 are shown by the curve designated with triangles. The results for jounce bumper E2 are shown by the curve designated with circles. The results for comparative jounce bumper C1 are shown by the curve designated by diamonds.

The area under the curve (Force X % Deflection) gives a measure of the total energy absorbed. The compression curve for comparative jounce bumper C1 (diamonds) is the lowest curve. Jounce bumpers according to the invention E1 (triangles) and E2 (circles) give higher curves, with greater area under the curve, showing increased absorption of energy.

Additionally, it can be seen from FIG. 3 that jounce bumpers according to the invention E1 and E2 do not significantly sacrifice maximum displacement. X10 KN for E1 and E2 is not significantly less than X10 KN for C1.

The invention claimed is:
1. A jounce bumper made of elastomeric thermoplastic material, comprising:
a hollow elongated tubular body having a wall, the tubular body having at least two bellows, each bellow being defined by a peak and a trough, the peak having a fillet radius of rs, the trough having a fillet radius of rc and a maximum wall thickness in the trough of Tmax; wherein rc is greater than rs, and wherein the ratio of Tmax, the maximum thickness of the wall in a trough to Tm, the thickness of the wall at intermediate points between peaks and troughs, is greater than or equal to 1.5, wherein the trough is defined by a wall arc having end points at said intermediate points where the wall thickness is Tm;

wherein each of said intermediate points is a point of tangency between a circle of radius rc and a circle of radius rs, or if rs and rc are not tangent, Tm is the wall thickness wherein each of said intermediate points is a midpoint of a line drawn tangent to circles rs and rc; and wherein the force required to compress said jounce bumper to 50 percent relative deformation is at least 14 percent greater than the force required to compress a jounce bumper to 50 percent relative deformation which does not have a ratio of Tmax to Tm of greater than or equal to 1.5.

2. A jounce bumper according to claim 1, wherein (Tmax/Tm), the ratio of maximum wall thickness in the trough to the thickness of the wall at said intermediate points, is greater than $(Tmax/Tm)_1$, wherein $(Tmax/Tm)_1 = 3.43 - 0.05\,P - 0.222\,SQRT\,(95 - 4.19\,P + 0.05P^2 - 0.23Ri)$, where Tmax is the maximum wall thickness at a trough;

Tm is the wall thickness wherein each of the intermediate points is a point of tangency between a circle of radius rc and a circle of radius rs, or if rs and rc are not tangent, Tm is the wall thickness wherein each of the intermediate points is a midpoint of a line drawn tangent to circles rs and rc;

SQRT is square root;

P is the pitch; and

Ri is the external radius at a trough.

3. A jounce bumper according to claim 2 comprising a thermoplastic elastomer that has a melt viscosity between 0.5 and 8 g/10 minutes, at 230° C. under 5 kg load measured according to ISO1133, and a hardness between at or about 45 and 60D measured at 1s according to ISO868.

4. A jounce bumper according to claim 2 comprising a thermoplastic elastomer that has a melt viscosity between 2 and 6 g/10 minutes, at 230° C. under 5 kg load measured according to ISO1133, and a hardness between at or about 45 and 60D measured at 1s according to ISO868.

5. A jounce bumper according to claim 2 comprising a thermoplastic elastomer that has a melt viscosity between 3 and 5 g/10 minutes, at 230° C. under 5 kg load measured according to ISO1133, and a hardness between at or about 45 and 60D measured at 1s according to ISO868.

6. A jounce bumper according to claim 1 comprising a thermoplastic elastomer that has a melt viscosity between 0.5 and 8 g/10 minutes, at 230° C. under 5 kg load measured according to ISO1133, and a hardness between at or about 45 and 60D measured at 1s according to ISO868.

7. A jounce bumper according to claim 1 comprising a thermoplastic elastomer that has a melt viscosity between 2 and 6 g/10 minutes, at 230° C. under 5 kg load measured according to ISO1133, and a hardness between at or about 45 and 60D measured at 1s according to ISO868.

8. A jounce bumper according to claim 1 comprising a thermoplastic elastomer that has a melt viscosity between 3 and 5 g/10 minutes, at 230° C. under 5 kg load measured according to ISO1133, and a hardness between at or about 45 and 60D measured at 1s according to ISO868.

9. A jounce bumper according to claim 1 comprising a thermoplastic elastomer that is selected from the group consisting of copolyetheresters and copolyesteresters that are copolymers having a multiplicity of recurring long-chain ester units and short-chain ester units joined head-to-tail through ester linkages, said long-chain ester units being represented by formula (A):

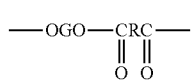
(A)

and said short-chain ester units being represented by formula (B):

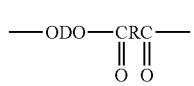
(B)

wherein

G is a divalent radical remaining after the removal of terminal hydroxyl groups from poly(alkylene oxide)glycols having preferably a number average molecular weight of between about 400 and about 6000; R is a divalent radical remaining after removal of carboxyl groups from a dicarboxylic acid having a molecular weight of less than about 300; and D is a divalent radical remaining after removal of hydroxyl groups from a diol having a molecular weight preferably less than about 250; and wherein said copolyetherester(s) preferably contain from about 15 to about 99 wt-% short-chain ester units and about 1 to about 85 wt-% long-chain ester units.

10. A jounce bumper according to claim 1 wherein Tmax occurs substantially in the middle of the trough.

11. A method for the manufacture of a jounce bumper, comprising the step of:

shaping elastomeric thermoplastic material into a hollow elongated tubular body having a wall, the tubular body having at least two bellows, each bellow being defined by a peak and a trough, the peak having a fillet radius of rs, the trough having a fillet radius of rc and a maximum wall thickness at the trough of Tmax;

wherein rc is greater than rs, and wherein the ratio of Tmax, the maximum thickness of the wall at a trough, to Tm, the thickness of the wall at intermediate points between peaks and troughs, is greater than or equal to 1.5, wherein the trough is defined by a wall arc having end points at said intermediate points where the wall thickness is Tm;

wherein each of said intermediate points is a point of tangency between a circle of radius rc and a circle of radius rs, or if rs and rc are not tangent, Tm is the wall thickness wherein each of said intermediate points is a midpoint of a line drawn tangent to circles rs and rc; and wherein the force required to compress said jounce bumper to 50 percent relative deformation is at least 14 percent greater than the force required to compress a jounce bumper to 50 percent relative deformation which does not have a ratio of Tmax to Tm of greater than or equal to 1.5.

12. A method of claim 11, wherein the method of shaping comprises a shaping operation selected from the group consisting of injection molding, extrusion, and blow molding.

13. A method according to claim 11 wherein Tmax occurs substantially in the middle of the trough.

14. A method for absorbing shocks in an automobile suspension comprising using a jounce bumper to absorb energy from displacement of the suspension, wherein the jounce bumper is made of elastomeric thermoplastic material and comprises a hollow elongated tubular body having a wall, the tubular body having at least two bellows, each bellow being defined by a peak and a trough, the peak having a fillet radius of rs, the trough having a fillet radius of rc and a maximum wall thickness at the trough of Tmax; wherein rc is greater than rs, wherein the ratio of Tmax the thickness of the wall at a trough, to Tm, the thickness of the wall at intermediate points between peaks and troughs, is greater than or equal to 1.5 wherein the trough is defined by a wall arc having end points at said intermediate points where the wall thickness is Tm;
   wherein each of said intermediate points is a point of tangency between a circle of radius rc and a circle of radius rs, or if rs and rc are not tangent, Tm is the wall thickness wherein each of said intermediate points is a midpoint of a line drawn tangent to circles rs and rc; and
   wherein the force required to compress said jounce bumper to 50 percent relative deformation is at least 14 percent greater than the force required to compress a jounce bumper to 50 percent relative deformation which does not have a ratio of Tmax to Tm of greater than or equal to 1.5.

* * * * *